May 24, 1966   H. SENGER   3,252,338
GYROSCOPE TAKE-OFF MEANS
Filed Feb. 7, 1962   3 Sheets-Sheet 3
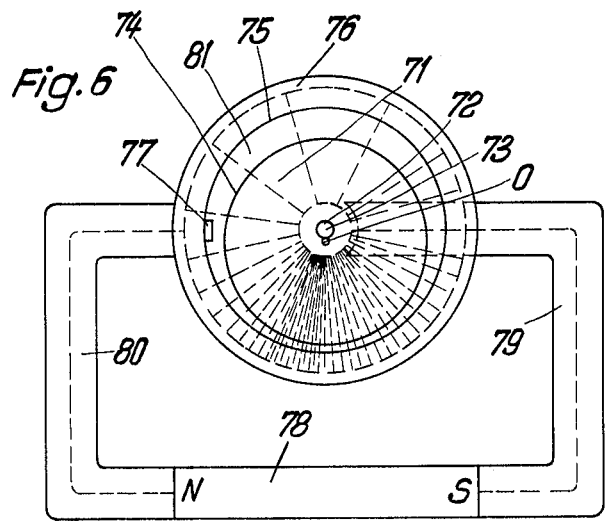
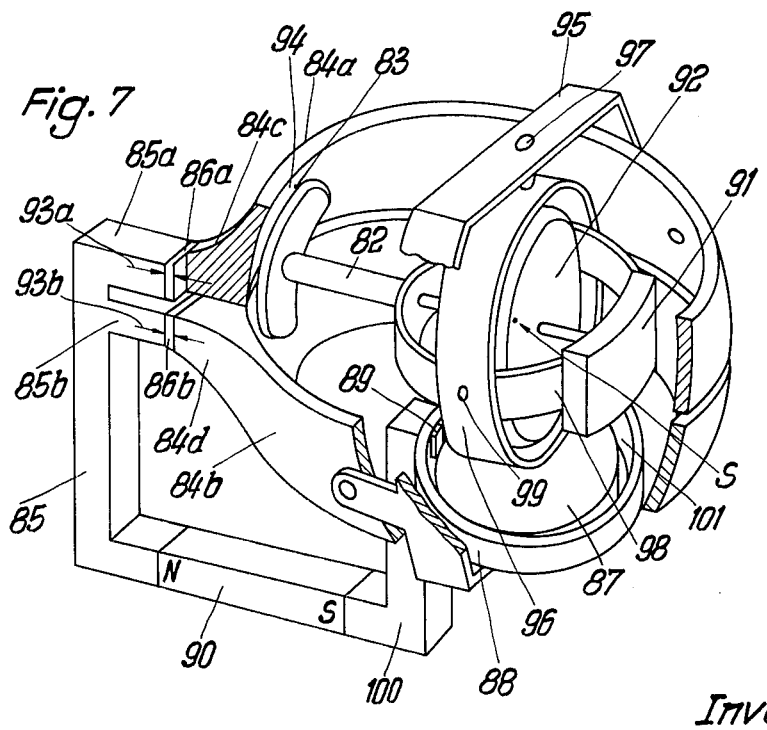
Inventor:
HORST SENGER
BY:
M. Glaser and Toren
ATTORNEYS

United States Patent Office 3,252,338
Patented May 24, 1966

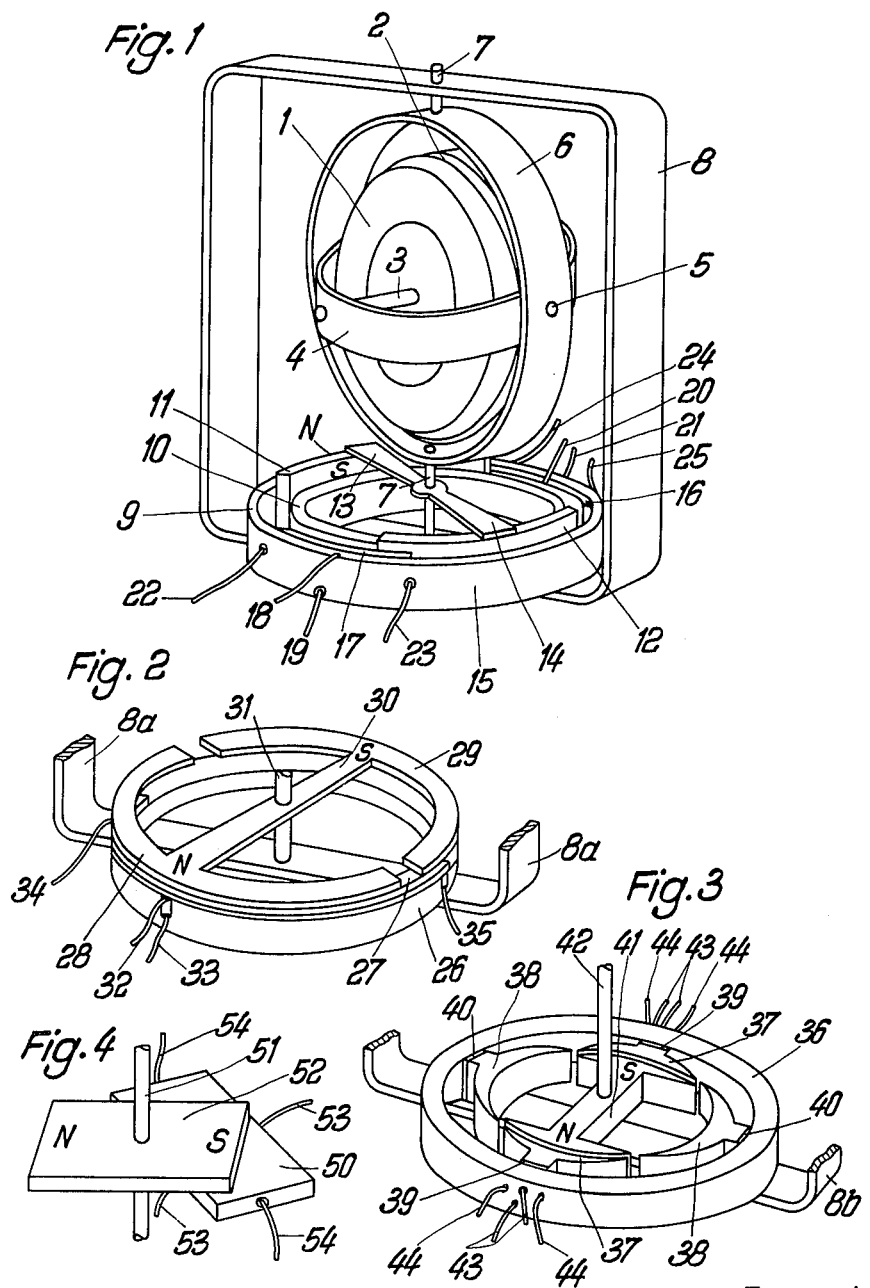

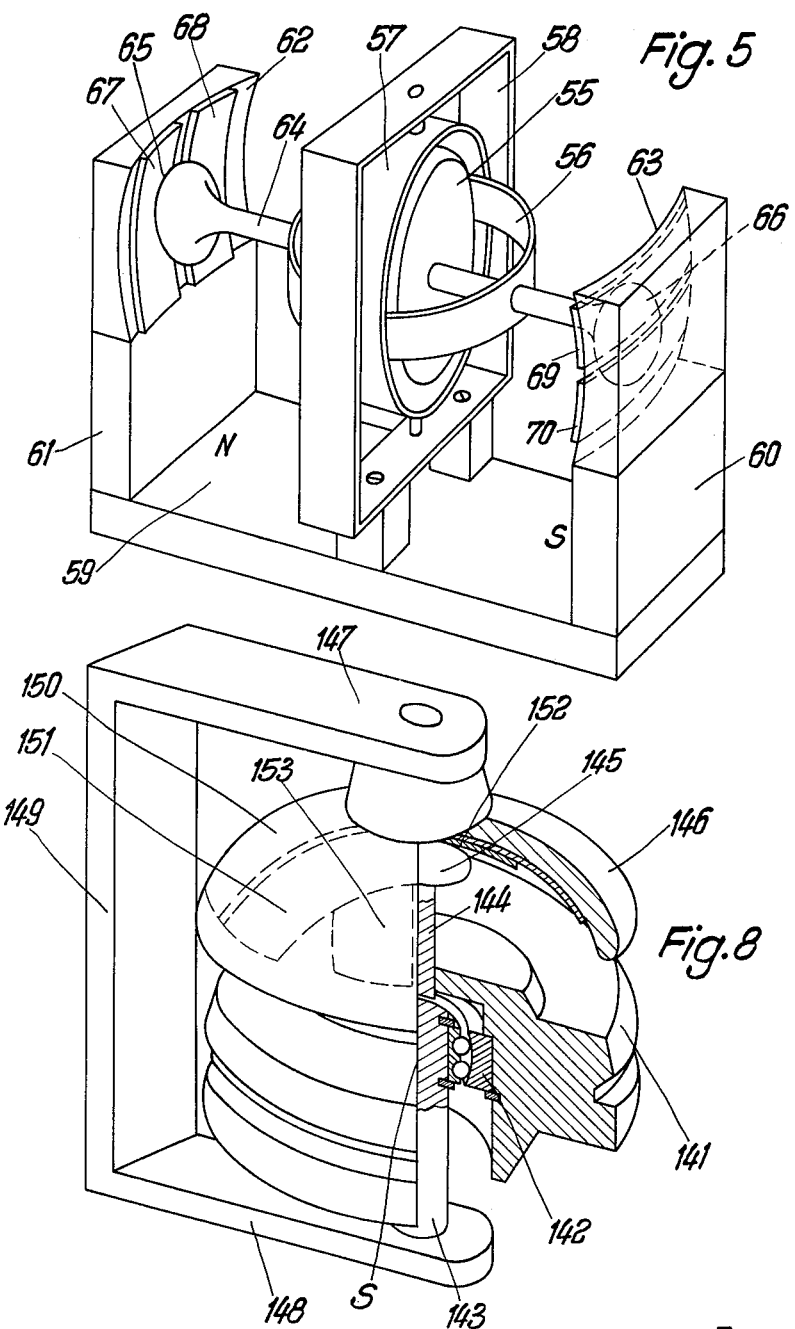

3,252,338
GYROSCOPE TAKE-OFF MEANS
Horst Senger, Ottobrunn, near Munich, Germany, assignor to Bolkow Gesellschaft mit beschrankter Haftung, Ottobrunn, near Munich, Germany
Filed Feb. 7, 1962, Ser. No. 171,725
Claims priority, application Germany, Feb. 9, 1961, B 61,186
19 Claims. (Cl. 74—5.6)

This invention relates to position take-off means for gyroscopes and, more particularly, to a novel position take-off means which has no reaction upon the gyroscope system.

Various types of position take-off means have been provided for deriving a signal or signals indicative of the relative angular orientation or aspect of the gyroscope. One form of such take-off means comprises voltage dividers or switches by means of which the angular orientation of a movably mounted mechanical system, relative to a stationary reference, is converted or transformed into an electrical quantity. A very important disadvantage of this form of take-off means is that the counter forces or reactions which arise at the voltage dividers, switches, flexible conductors or slip rings react upon the precession deflections of the gyroscope, and thus result in an inaccurate indication of the aspect of the gyroscope. A further source of disturbance in such take-off means comprises the sliding contacts of the voltage dividers or switches, which have to operate under very unfavorable conditions so that the contact obtained is insufficient for measuring purposes, due to the contact pressure being maintained at a very low value to reduce friction as much as possible. This very low contact pressure is usually not sufficient to eliminate contamination of the contact surfaces, such as caused by dust and oxidation.

Another known take-off arrangement involves electronic devices for measuring the relative angular orientation or aspect of the gyroscope and providing a signal indicative of such position. Arrangements of this type contain variable inductances or capacitances and are relatively expensive.

A still further form of take-off means comprises photoelectric devices for providing an electric signal indicative of the relative angular orientation or aspect of the gyroscope. Not only are these arrangements relatively expensive, but they have a very small output current and are very sensitive with respect to dust and oxidation of reflecting surfaces.

In accordance with the invention, the defects and disadvantages of known take-off means for providing electrical indications of the relative angular orientation or aspect of gyroscope systems are avoided by utilizing, as a position take-off means, "Hall" generators preferably provided with a substantially constant excitation current and having their output potentials varied by magnetic means whose position, relative to the Hall generators, is varied in accordance with angular movement of the gyroscope system.

As is known to those skilled in the art, "Hall" generators are electric semi-conductors whose output potentials (Hall potentials), measured in one direction, are proportional to an excitation current flowing through the generator in a direction perpendicular to such one direction, and whose output potentials are further proportional to a magnetic flux or field extending perpendicularly both to the direction of flow of the excitation current and to the direction of the Hall potential.

In accordance with the present invention, the excitation current can be maintained constant or can be varied in accordance with a function extraneous to the gyroscope and which is superposed on the gyroscope measuring value, such as, for example, to provide temperature compensation. In the following description, for the sake of simplicity, a constant excitation current is assumed so that the Hall potential which is produced is directly proportional to the magnetic flux flowing through the Hall generator.

Accordingly, an object of the invention is to provide gyroscope system take-off means useable with almost any known gyroscope or gyroscope system and characterized by simple construction, fast response and resistance to ageing.

A further object of the invention is to provide such a take-off means which operates without friction so that the gyroscope system is not subjected to any precession disturbances as a result of reactions in the take-off means.

A further object of the invention is to provide such a take-off means in which the electronic portion thereof requires only a few parts and is relatively inexpensive.

Another object of the invention is to provide such a take-off means in which at least one paramagnetic body is fixedly connected with the outer gimbal ring, with the inner gimbal ring, or with both gimbal rings of a gyroscope which is mounted in gimbals for universal angular deflection, or which body is fixed to the gyroscope proper. This paramagnetic body may comprise several portions and may contain soft iron portions or permanent magnets, and be combined with diamagnetic material portions.

A still further object of the invention is to provide such a take-off means in which the paramagnetic body is arranged in a magnetic circuit which is closed by paramagnetic yokes which are fixedly mounted with respect to a support frame for the gyroscope system. These yokes may comprise a single piece or may comprise several pieces joined together, and may be formed of soft iron and may contain a permanent magnet or an electromagnet, or alternatively they may be in the form of a permanent magnet or an electromagnet.

Still another object of the invention is to provide a take-off means for a gyroscope which is mounted for universal movement in a pair of gimbals movable about mutually perpendicular axes, and in which angular motion of both gimbals is compared with a stationary reference.

A subsidiary object is to provide a take-off means of this type in which the deflection measuring systems are included in a common magnetic circuit.

In further accordance with the invention, where the outer gimbal frame is mounted for angular motion in two directions and to any desired angular extent, an object of the invention is to provide a take-off means whereby, for each position of the outer gimbal frame, indications of the deflections of both the inner and outer gimbal frames can be provided and compared with a stationary reference system.

A further object of the invention is to provide a take-off means for universally mounted gyroscopes in which the position signal or signals are provided by Hall generators wherein the magnetic flux traversing the Hall generators is a variable portion of a constant total magnetic flux flowing in a closed magnetic circuit, so that there is no reaction from the take-off means on the gyroscope system.

A further object is to provide a take-off means of the type just mentioned in which the Hall generators may be arranged in superposed layers and with the Hall potential directions of successive layers being perpendicular to each other, and which is particularly suitable for providing an indication of the angular orientation or aspect of gyroscopes mounted in self-aligning ball bearings.

With these and other objects in view, the nature of which will be more apparent, the invention will be more fully understood by reference to the drawings, the accompanying detailed description and the appended claims.

In the drawings:

FIG. 1 is an oblique parallel projection of a gimbal mounted gyroscope system incorporating take-off means embodying the invention;

FIGS. 2 and 3 are oblique parallel projections of alternative forms of take-off means embodying the invention and useable with the gyroscope system of FIG. 1;

FIG. 4 is a schematic illustration of the take-off means of the invention;

FIG. 5 is an oblique parallel projection of a gimbal mounted gyroscope system incorporating the take-off means of the present invention as used to provide an indication of the angular movements of the inner and outer gimbal;

FIG. 6 is a plan view of a take-off means, embodying the invention, in which a Hall generator of small dimensions is so positioned that it is always completely within the magnetic flux path, but in which the value of the magnetic flux effective upon the Hall generator is varied in accordance with the aspect of a gyroscope system;

FIG. 7 is an oblique parallel projection of a gimbal mounted gyroscope system in which the take-off means of the invention comprises Hall generators of small dimensions, and which is arranged to provide indications of the relative angular positions of both the inner and outer gimbals; and FIG. 8 is an oblique parallel projection, partly in section, of a gyroscope system in which the gyroscope is mounted for universal movement on a self-aligning ball bearing, and with the Hall generators of the invention take-off means positioned in superposed layers which are mutually perpendicular to each other.

Referring to FIG. 1, the gyroscope system therein illustrated includes a gyroscope 1 which may be driven in any suitable manner, such as pneumatically, electrically or mechanically, as by a cord or belt drive engaged with the circumferential groove 2. The gyroscope rotates about an axis 3 and is mounted in an inner gimbal 4 which is rotatable about an axis 5 perpendicular to the gyroscope axis 3. Inner gimbal 4 is mounted in an outer gimbal 6, which is rotatable about an axis 7 which is mutually perpendicular to both the gyroscope axis 3 and the inner gimbal axis 5. The outer gimbal 6 is rotatably mounted in a frame 8, for rotation about the axis 7.

In accordance with the invention, a pair of arms 13 and 14 are fixedly secured to the axis 7, these arms being diamagnetic material and having, at their outer ends, concentric arcuate permanent magnets 11 and 12 magnetized in radial directions. The permanent magnets 11 and 12 move freely, and without frictional contact, between the legs 9 and 10 of a U-shaped yoke ring 15, and are concentric with the axis 7. Ring 15 is fixedly connected with frame 8. It will be noted that those surfaces of the permanent magnets 11 and 12 which are adjacent the same leg, 9 or 10, of the ring 15, have opposite polarities.

A pair of Hall generators 16 and 17 is positioned in the air gap between the leg 9 and the magnets 11 and 12, and do not contact the magnets 11 and 12. A variable portion of a constant magnetic flux, which variable portion is proportional to the deflection of the outer gimbal 6, flows through the Hall generators 16 and 17 perpendicularly to the axis 7. The Hall generators 16 and 17 are supplied with a constant excitation current by the input leads 22, 23 and 24, 25, respectively. The output Hall potentials, which are directly or indirectly proportional to the system deflections to be measured, are derived through the output leads 18, 19 and 20, 21, respectively. Deflections of an angular extent greater than 180°, due to the opposite polarization of the permanent magnets 11 and 12, reverse the magnetic flux direction through the Hall generators 16 and 17, correspondingly to reverse the directions of the Hall potentials in the output leads 18–21.

The thus-derived Hall potentials may be applied in any known manner to the input of an amplifier which may be combined in a single structural unit with the gyroscope system. The number of Hall generators, and the number of permanent magnets as well as their circumferential extent, are selected in accordance with the maximum angular deflection to be measured and further in accordance with the particular electronic means used to provide the indications of the deflections. The yoke ring 15 may be constructed as a permanent magnet magnetized in a radial direction and, in this case, instead of the permanent magnets 11 and 12, correspondingly shaped soft iron or other paramagnetic material bodies may be used.

FIG. 2 illustrates another embodiment of the take-off means, and which may be used with the gyroscope system of FIG. 1. In this embodiment, a Hall generator 27 is fixed on a yoke ring 26 in turn fixedly mounted on a frame 8a. A permanent magnet 30, having semi-circular pole shoes 28 and 29, is fixed to the axle 31 of the outer gimbal. A constant excitation current is supplied to the Hall generator 27 by the input leads 34, 35, and the Hall potential, variable in accordance with the deflection of the gyroscope system, is derived through the output leads 32 and 33.

The embodiment of the take-off means shown in FIG. 3 may also be used with a gyroscope system such as shown in FIG. 1. In this embodiment, a yoke ring 36 is mounted fixedly on a frame 8b and has two pairs of poles 37, 37 and 38, 38. The poles of each pair are arranged diametrically opposite each other, and the two pairs are arranged at right angles to each other. Hall generators 39 are arranged between the surfaces of at least one pair of poles 37 and the soft iron yoke ring 36. Similarly, either Hall generators or diamagnetic material bodies 40 can be positioned between each of the other poles 38 and the ring 36.

For example, the Hall generators 39 can be arranged to supply the deflection measuring potentials for deflections in opposing directions, and the Hall generators 40 can be designed to supply a positive or a negative reference for these potentials.

A permanent magnet armature 41 is fixedly connected with the axle 42 of the outer gimbal for rotation between the pole pairs, and has pole faces of substantial arcuate extent, for example equal to the arcuate extent of the poles mounted on the ring 36. Leads 43, passing through the ring 36, supply the constant excitation potential for the Hall generator, and leads 44, also passing through the ring 36, provide the output potential.

FIG. 4 diagrammatically illustrates the operation of the invention take-off means. The opposite poles of a permanent magnet 52 can be oscillated over or above a Hall generator 50, the magnet 52 being affixed to an axle 51 which may be the axis of the outer gimbal of the gyroscope system. This arrangement differs from that of FIG. 1 primarily in that it requires only a single Hall generator and a single permanent magnet. The Hall potentials may be derived by output leads 53, and the constant excitation current for the Hall generator may be supplied by the input leads 54.

FIG. 5 illustrates an arrangement in which the gyroscope system and its mountings are substantially similar to those of FIG. 1. To simplify the illustration, the input and output leads of the Hall generators have been omitted. In FIG. 5, a gyroscope 55 is rotatably mounted in an inner gimbal 56 which, in turn, is rotatably mounted in an outer gimbal 57 which is rotatably mounted in a frame 58. The indications provided are dependent upon the angular deflections of the inner gimbal 56, while the angular deflections of the outer gimbal 57 are also measured. A bar-shaped permanent magnet 59, magnetized in a longitudinal direction, has soft iron yokes 60 and 61 at its ends. The upper outer portions of these yokes have spherical inner surfaces which are concentric with the center of gravity of the gyroscope 55. The gyroscope axis 64 is extended beyond the inner gimbal 56 and carries, at its ends, heads 65 and 66 which have spherical outer surfaces concentric with the surfaces 62 and 63 and radially spaced from such surfaces. The gyroscope axis is formed of paramagnetic material and it is part of the magnetic circuit. A first pair of Hall generators 67, 68 is positioned on the surface 62 of yoke 61, and a second pair of similarly shaped Hall generators 69 and 70 is positioned on the surface 63 of the yoke 60, the inner surfaces of the Hall generators being spaced from, and out of contact with, the outer surfaces of heads 65 and 66, respectively.

The Hall potential axes of the generators 67 and 68 extend in a generally vertical direction, while the Hall potential axes of the generators 69 and 70 extend in a general horizontal direction, both as viewed in FIG. 5. The peripheries of the heads 65 and 66 are circular and concentric with the gyroscope axis, so that rotation about this axis has no influence on the magnetic flux through the Hall generators.

Deflections of the gyroscope axis 64 in a vertical direction have no effect on the Hall potentials derived from the generators 67 and 68, but deflections in a horizontal direction produce a variable Hall potential output from the generators 67 and 68. Similarly, only vertical deflections of the gyroscope axis 64 produce variable Hall potential outputs from the Hall generators 69 and 70, whose Hall potential axes are generally horizontal. The Hall potentials derived from the Hall generators 67 and 68 are proportional to angular deflections of the outer gimbal frame 57, and the Hall potentials derived from the Hall generators 69 and 70 are proportional to the angular deflections of the inner gyroscope gimbal 56.

The size and weight of the arrangement shown in FIG. 5 may, if necessary, be reduced by omitting one of the soft iron yokes 60 or 61, with the Hall generators then being arranged in superposed layers on the other yoke and with their Hall potential axes mutually perpendicular. In such case, the permanent magnet 59 may be correspondingly shortened.

In the embodiment of the invention shown in FIG. 6, the magnetic circuit includes a circular disc, of paramagnetic material, which is fixed to the axle 72 of the outer gimbal. The axis of rotation 73 of disc 71 is eccentric with respect to its geometric center O. The disc 71 is surrounded by the inner surface 75 of a yoke ring 76, surface 75 being concentric with the axis of rotation 73 of the disc 71. The air gap 81 between the periphery 74 of disc 71 and the inner surface 75 of ring 76 maintains a constant shape in all angular positions of the disc 71, and it will be noted that the length of the air gap between the pole faces of the magnetic loop is constant in all such angular positions.

A Hall generator 77 is mounted on the surface 75 of yoke ring 76 and has dimensions small enough so that it is entirely disposed within the magnetic flux path between the pole faces of the magnetic loop. Specifically, the surface of the Hall generator 77 traversed by the magnetic flux is much smaller than the cross sectional area of the air gap 81 traversed by such flux. Upon rotation of circular disc 71, the entire surface of the Hall generator 77, due to the "wedge" shape of the air gap 81, is traversed by partial magnetic flux of varying magnitude, or the effectived magnetic flux through the Hall generator 77 is varied, in accordance with variations in the spacing of periphery 74 from the Hall generator 77. In the illustrated embodiment, the Hall potential will increase with clockwise rotation of disc 71, and will be decreased with counterclockwise rotation thereof. The magnetic loop or circuit includes a permanent magnet 78 and yokes 79 and 80.

FIG. 7 illustrates a gyroscope system embodying the invention wherein the magnetic deflections of both the inner and outer gimbals may be measured, the input and output leads of the Hall generator being omitted to simplify the drawing. The gyroscope 92 is gimbal mounted in the frame 95, and includes a magnetic loop or circuit comprising a paramagnetic body 87, a yoke ring 88 surrounding the body 87, an air gap 101, and a Hall generator 89. This magnetic loop, which is shown in simplified manner in FIG. 6, measures the angular deflection of the outer gimbal 96 about its axis 97.

A paramagnetic body 82 is secured to the inner gimbal 98 and has, at its free end, a head which, while relatively elongated in one diametric direction, has a substantially spherical outer surface which is concentric with the center of gravity S of the gyroscope 92. This spherical surface 83, when both gimbals 98 and 96 deflect angularly, moves over a spherical surface zone provided by annular spaced yokes 84a and 84b, whose inner surfaces are spherical about the center of gravity S of gyroscope 92. During horizontal angular deflections of the body 82, the components of the magnetic flux flowing through the device will remain constant in both yokes 84a and 84b. However, during vertical deflections of the body 82, the magnetic flux flowing through one of the yokes 84a will be increased and that flowing through the other yoke 84b will be decreased, or vice-versa, in correspondence with the vertical deflection.

The Hall generators 86a and 86b are mounted in fixed value air gaps 93a and 93b between projections or abutments 84c and 84d, respectively of yokes 84a and 84b and legs 85a and 85b, respectively, of a magnetic loop or circuit 85. The Hall potentials of the generators 86a and 86b are proportional to the angular deflections of the inner gimbal 98.

Between the yokes of the magnetic loop 85, there is positioned a permanent magnet 90 providing a constant total magnetic flux through the loop. The magnetic flux from the north pole of permanent magnet 90 flows through yoke web 85 and its legs 85a and 85b, through Hall generators 86a and 86b, abutments 84c and 84d, and yokes 84a and 84b. In so doing, it traverses an air gap 94 between the yokes 84a and 84b and the body 82 to reach the gyroscope system, and then traverses the body 82, the inner gimbal 98, and the axle 99 to the outer gimbal 96 and the paramagnetic body 87. From the body 87, the magnetic flux reaches the yoke ring 88 so that a variable portion of the flux will traverse the Hall generator 89. Yoke ring 88 is connected with the south pole of the permanent magnet 90 by means of the paramagnetic member 100, and thus closes the magnetic circuit.

The device is preferably so designed that the permanent magnet 90, or a corresponding electromagnet, is built in as the last part to be added. Yokes 84a and 84b can be combined to form a central body having approximately the shape of a hollow sphere, with a ring of diamagnetic material being interposed between the two yokes to provide the two separate yoke portions. A counterweight 91 on the inner gimbal 98 compensates the weight of body 82.

Outer gimbal 96 is rotatable about its axis 97 in both rotational directions through any angular amount. The take-off means provides, for each position of the outer gimbal, an indication of the angular deflections of both the inner gimbal and the outer gimbal relative to a stationary reference system. With two gyroscope systems of a similar construction, all of the movement of a flying body can be measured and controlled, including rolling about an axis.

FIG. 8 illustrates a gyroscope 141 which, through the medium of a self-aligning ball bearing 142, is mounted so as to be oscillatable in all directions about its center of gravity S, the ball bearing 142 being provided at the end of a paramagnetic support post or bolt 143. A cylindrical body 144 extends coaxially from the gyroscope 141 and its free end 145 has a spherical outer surface coaxial with the gravity center S. The post 143 and a dome-shaped body 146 are mounted on the two legs 147 and 148 of a yoke 149 constituting the magnetic circuit or loop, or a portion thereof. Two adjacent Hall generators 150 and 151 are positioned in parallel relation on the inner spherical surface of the body 146, and two additional Hall generators 152 and 153 are superposed over the Hall generators 150, 151. The Hall potential axes of the generators 150 and 151 are perpendicular to the Hall potential axes of the generators 152 and 153. Either post 143, body 144 or yoke 149 may be constructed as a permanent magnet to provide the magnetic flux.

The Hall generators are supplied with constant excitation current and the Hall potentials are derived by means which may be provided in a manner such as already shown and described. Upon deflection of the cylindrical body 144, Hall potentials are produced in the four Hall generators in correspondence with the direction and degree of the angular deflections.

It will be noted that the arrangements shown in FIGS. 1–5 and 8 involve Hall generators which have relatively large surfaces traversed by the magnetic flux, while the embodiments of FIGS. 6 and 7 show Hall generators which have a relatively small surface traversed by the magnetic flux. All of the devices have magnetic circuits providing a constant magnetic flux. However, in the arrangement shown in FIGS. 1–5 and 8, the Hall generators, upon deflection of the movable portions of the system, are traversed by flux flowing through varying surface areas thereof. By contrast, in the arrangements shown in FIGS. 6 and 7, the surfaces of the Hall generators are traversed by variable components of a constant magnetic flux.

While specific embodiments of the invention have been shown and described in detail to illustrate the application of the principles of the invention, it will be understood that the invention may be embodied otherwise without departing from such principles.

What is claimed is:

1. Take-off means for a gyroscope mounted for relative angular deflection in plural directions, comprising, in combination, a Hall generator; means supplying an excitation current through said Hall generator; and magnetic circuit means providing a magnetic flux traversing said Hall generator perpendicularly to the direction of excitation current flow therethrough, and including paramagnetic means movable in accordance with angular deflections of the gyroscope and effective to correspondingly vary the magnetic flux effect on said Hall generator to provide a Hall potential output proportional to said angular deflection.

2. Take-off means for a gyroscope as claimed in claim 1, in which said paramagnetic means is fixedly secured to said gyroscope.

3. Take-off means for a gyroscope as claimed in claim 1, said gyroscope being rotatably mounted in an inner gimbal; said inner gimbal being rotatably mounted in an outer gimbal for rotation about an axis perpendicular to the axis of said gyroscope, said outer gimbal being rotatably mounted in a frame for rotation about an axis which is mutually perpendicular to the axis of said inner gimbal and to the axis of said gyroscope; said paramagnetic means being fixedly secured to one of said gimbals.

4. Take-off means for a gyroscope as claimed in claim 3, in which said paramagnetic means is fixedly secured to said outer gimbal.

5. Take-off means for a gyroscope as claimed in claim 3, in which said paramagnetic means is fixedly secured to said inner gimbal.

6. Take-off means for a gyroscope as claimed in claim 1, said gyroscope being rotatably mounted in an inner gimbal; said inner gimbal being rotatably mounted in an outer gimbal for rotation about an axis perpendicular to the gyroscope axis; said outer gimbal being rotatably mounted in a fixed frame for rotation about an axis which is mutually perpendicular to the axis of rotation of said gyroscope and to the axis of rotation of said inner gimbal; said magnetic circuit means including at least one paramagnetic yoke fixed with respect to said frame.

7. Take-off means for a gyroscope as claimed in claim 6, in which said Hall generator is fixedly secured to said yoke.

8. Take-off means for a gyroscope as claimed in claim 7, in which there is a constant magnetic flux flowing between said paramagnetic means and said yoke.

9. Take-off means for a gyroscope as claimed in claim 6, in which said magnetic circuit means has successive air gaps; said Hall generator being mounted in one of said air gaps and being oriented so that its Hall potential output is proportional to angular deflection of one of said gimbals; and a second Hall generator mounted in another of said air gaps and oriented so that its Hall potential output is proportional to the angular deflection of the other of said gimbals.

10. Take-off means for a gyroscope as claimed in claim 6, said yokes having therein an air gap of constant geometric dimensions; said paramagnetic means comprising a paramagnetic member movably mounted in said air gap; said Hall generator being disposed in said air gap adjacent said movable member and having a surface perpendicular to the direction of the magnetic flux and which surface has an area substantially smaller than the cross sectional area of said air gap traversed by the magnetic flux; said paramagnetic member varying the effective magnetic flux traversing said Hall generator.

11. Take-off means for a gyroscope as claimed in claim 1, in which the entire surface of said Hall generator perpendicular to the direction of traverse of the magnetic flux is traversed by the magnetic flux; said Hall generator being positioned between stationary paramagnetic elements of said magnetic circuit means.

12. Take-off means for a gyroscope as claimed in claim 1, in which said paramagnetic means comprises a permanent magnet.

13. Take-off means for a gyroscope as claimed in claim 1, in which said Hall generator and said paramagnetic means are so related that, upon an angular deflection of said paramagnetic means of at least 180°, the direction of traverse of the magnetic flux through the Hall generator is reversed.

14. Take-off means for a gyroscope as claimed in claim 1, in which said magnetic circuit means comprises a yoke of paramagnetic material; and a permanent magnet included in said yoke.

15. Take-off means for a gyroscope as claimed in claim 1, said gyroscope being rotatably mounted in an inner gimbal of paramagnetic material; said inner gimbal being rotatably mounted in an outer gimbal of paramagnetic material for rotation about an axis perpendicular to the axis of rotation of said gyroscope; said outer gimbal being mounted in a fixed frame for rotation about an axis which is mutually perpendicular to the axis of said inner gimbal and the axis of said gyroscope; an elongated paramagnetic element extending from said inner gimbal coaxial with the gyroscope axis; a paramagnetic material head on the free end of said element and having a substantially spherical outer surface concentric with the center of gravity of said gyroscope; a pair of annular yokes of paramagnetic material disposed in adjacent and substantially parallel spaced relation, the inner surfaces of both of said yokes being substantially spherical and concentric with the center of gravity of said gyroscope; said head being movable with its spherical outer surface in radially spaced relation to the spherical inner surfaces of both of said yokes to provide an air gap therewith; a circular disc of paramagnetic material secured to said outer gimbal to extend perpendicular to the axis of said outer gimbal; said disc being eccentric to the axis of said outer gimbal; a third annular yoke of paramagnetic material surrounding said disc and concentric with the axis of said outer gimbal; a substantially rectangular paramagnetic frame constituting a portion of said magnetic circuit means, said yokes being fixed relative to said frame; said frame having a pair of legs extending in spaced parallel relation from an end thereof; said first pair of annular yokes having abutments extending therefrom in spaced parallel relation to each other and forming air gaps with said legs; there being a pair of said Hall generators each disposed in one of said air gaps; a permanent magnet incorporated in said paramagnetic frame; said third annular yoke being secured to the opposite end of said magnetic frame; said third annular yoke forming an air gap with said disc; and a third Hall generator disposed in said last-mentioned air gap adjacent the connection of said third yoke to the opposite end of said magnetic frame.

16. Take-off means for a gyroscope as claimed in claim 1, said gyroscope being mounted in an inner gimbal of paramagnetic material, said inner gimbal being rotatably mounted in an outer gimbal of paramagnetic material for rotation about an axis perpendicular to the axis of said gyroscope; said outer gimbal being rotatably mounted in a frame for rotation about an axis which is mutually perpendicular to the axis of said inner gimbal and to the axis of said gyroscope; a pair of diametrically aligned relatively elongated paramagnetic material members extending from said inner gimbal in opposite directions and coaxial with the gyroscope axis, each of said members having an enlarged paramagnetic head on its free end having a substantially spherical outer surface; a substantially U-shaped yoke of paramagnetic material the outer ends of whose legs have inner surfaces which are spherical and concentric with the center of gravity of said gyroscope and each spaced from a spherical outer surface of a respective one of said heads to form therewith an air gap; said yoke including a permanent magnet extending longitudinally between said legs; a first pair of Hall generators secured on one of said spherical inner surfaces in spaced parallel relation for cooperation with one of said heads; and a second pair of Hall generators secured on the other of said spherical inner surfaces in spaced parallel relation for cooperation with the other head, and having their orientation at right angles to the orientation of said first pair of Hall generators; whereby the Hall potential outputs of said first pair of Hall generators are proportional to angular deflection of said gyroscope in one direction and the Hall potential outputs of said second pair of Hall generators are proportional to angular deflections of said gyroscope in a second direction perpendicular to said first direction.

17. Take-off means for a gyroscope as claimed in claim 1, in which said gyroscope is rotatably mounted on a substantially spherical self-aligning anti-friction bearing for freedom of angular deflection in two directions which are mutually perpendicular; a relatively elongated paramagnetic member extending coaxially from said gyroscope; a relatively enlarged head of paramagnetic material secured to the outer end of said member and having a substantially spherical outer surface concentric with the center of gravity of said gyroscope; a substantially dome-shaped yoke of paramagnetic material mounted concentric with the center of gravity of said gyroscope and having a substantially spherical inner surface in radially spaced parallel relation to the outer spherical surface of said head to form an air gap therewith; a first pair of Hall generators extending across said inner surface in spaced parallel relation for cooperation with said enlarged head constituting said paramagnetic means; a second pair of Hall generators arranged in spaced parallel relation and superposed on said first pair of Hall generators, the orientations of said first and second pairs of Hall generators being mutually perpendicular; said dome-shaped yoke member comprising part of said magnetic circuit means; and a paramagnetic frame constituting the remainder of said magnetic circuit means and including a permanent magnet.

18. For interchangeable use with gyroscopes mounted for relative angular deflection in plural directions, a take-off unit comprising, in combination, a Hall generator; means supplying an excitation current through said Hall generator in one direction; means forming a magnetic circuit providing a magnetic flux traversing said Hall generator perpendicular to the direction of excitation current flow therethrough; said magnetic circuit forming means including a movable paramagnetic member in operative relation with said Hall generator and controlling the effective magnetic flux traversing said Hall generator; said member being constructed and arranged for securement to a gyroscope or to a portion of its mounting means for movement in accordance with angular deflection of the gyroscope.

19. A take-off unit as claimed in claim 18, in which said magnetic circuit forming means includes a permanent magnet.

References Cited by the Examiner

UNITED STATES PATENTS 2,200,431  5/1940  Rateau _____ 74—5.6 X
2,856,778  10/1958 Kiebert _____ 74—5.6

BROUGHTON G. DURHAM, *Primary Examiner.*

TEN EYCK W. SHEAR, *Assistant Examiner.*